United States Patent
Goto

(10) Patent No.: US 6,273,659 B1
(45) Date of Patent: Aug. 14, 2001

(54) LOCKING MECHANISM FOR A ROTARY WORKING MEMBER

(75) Inventor: Yoshiaki Goto, Nagoya (JP)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 09/355,384

(22) PCT Filed: Feb. 16, 1998

(86) PCT No.: PCT/US98/02778

§ 371 Date: Jul. 27, 1999

§ 102(e) Date: Jul. 27, 1999

(87) PCT Pub. No.: WO98/36181

PCT Pub. Date: Aug. 20, 1998

(30) Foreign Application Priority Data

Feb. 17, 1997 (JP) .................................................. 9-048480

(51) Int. Cl.$^7$ .............................. F16B 19/00; F16B 37/08
(52) U.S. Cl. ......................... 411/432; 411/354; 411/535; 411/917
(58) Field of Search ................................... 411/354, 432, 411/348, 535, 917, 919

(56) References Cited

U.S. PATENT DOCUMENTS

| | | |
|---|---|---|
| 4,525,097 | 6/1985 | Ziegelmeyer . |
| 4,850,154 | 7/1989 | Grammer et al. . |
| 4,941,790 * | 7/1990 | Kirn ..................................... 411/535 |
| 4,955,744 | 9/1990 | Barth et al. . |
| 4,976,071 | 12/1990 | Stabler . |
| 4,980,994 | 1/1991 | Helm et al. . |
| 5,042,207 | 8/1991 | Kirn . |
| 5,161,334 | 11/1992 | Schaal et al. . |
| 5,175,963 | 1/1993 | Schafer et al. . |
| 5,177,905 | 1/1993 | Takahashi et al. . |
| 5,259,145 | 11/1993 | Fushiya et al. . |
| 5,388,942 * | 2/1995 | Bonacina et al. ..................... 411/432 |
| 5,518,440 | 5/1996 | Bone . |
| 5,545,078 | 8/1996 | Schulz et al. . |
| 5,567,100 | 10/1996 | Nakamura . |
| 5,577,872 * | 11/1996 | Nakamura ............................. 411/432 |
| 5,810,533 | 9/1998 | Nakamura . |
| 5,871,322 | 2/1999 | Nakamura . |
| 5,899,648 | 5/1999 | Kanaan et al. . |
| 6,050,741 | 4/2000 | Aultman et al. . |

FOREIGN PATENT DOCUMENTS

| | | |
|---|---|---|
| 3012836 | 9/1985 | (DE) . |
| 3824040 | 11/1989 | (DE) . |
| 3903767 | 8/1990 | (DE) . |
| 4031725 | 4/1992 | (DE) . |
| 4102420 | 7/1992 | (DE) . |
| 4209146 | 9/1992 | (DE) . |
| 4238466 | 1/1994 | (DE) . |
| 4243328 | 6/1994 | (DE) . |
| 0588483 | 3/1994 | (EP) . |
| 0600854 | 6/1994 | (EP) . |
| 0631844 | 1/1995 | (EP) . |
| 2101513 | 3/1972 | (FR) . |
| 825877 | 12/1959 | (GB) . |
| 2252061 | 7/1992 | (GB) . |

* cited by examiner

Primary Examiner—Neill Wilson
(74) Attorney, Agent, or Firm—Nelson Mullins Riley & Scarborough, LLP

(57) ABSTRACT

An operating ring (7) is externally fitted, with the ability to rotate, to the main body of the locking nut in between a locking flange (3) and a flange of the locking nut (5); ball bearings (11) are inserted between the operating ring and the locking flange; three or more arc-shaped grooves (54) are formed—facing toward each other and extending in concentric shapes in the circumferential direction—in the mating surfaces of the flange of the locking nut and the operating ring; locking balls (9) are accommodated inside the arc-shaped grooves of the flange of the locking nut (5) and the operating ring which face toward each other; the total dimension—in the axial direction of the rotary drive shaft—of each pair of arc-shaped grooves which accommodate the locking balls (9) is set smaller than the diameter of a locking ball; and a localized indentation is formed at the bottom surfaces on at least one side of said pair of arc-shaped grooves.

4 Claims, 7 Drawing Sheets

LOCKING MECHANISM FOR A ROTARY WORKING MEMBER

DETAILED DESCRIPTION OF THE INVENTION

This invention relates to a locking mechanism for a rotary working member, and in particular it relates to an improvement of the technique for locking/relaxing rotary operating parts—such as the grinding disks of rotary grinders or the rotary wire cutters of lawnmowers—to rotary drive shafts.

FIG. 14 shows the typical configuration of a conventional locking mechanism of the above type. In this locking mechanism, a working member D and a locking flange 3 are loosely fitted to the small-diameter threaded part 1b of a rotary drive shaft 1 equipped with a large-diameter part 1a and a small-diameter threaded part 1b. A locking nut 5 is also screwed to the small-diameter threaded part 1b of rotary drive shaft 1. During locking, locking nut 5 is made to turn, thereby pressing working member D via locking flange 3 against the end surface of large diameter part 1a of rotary drive shaft 1, and working member D is thereby locked to rotary drive shaft 1. Also, during relaxation, a special tool such as a two-point spanner is used to turn locking nut 5 in the unscrewing direction.

However, rotary drive shaft 1 turns in the unscrewing direction, which is contrary to the usual screwing direction of locking nut 3, and performs a specific operation with its working member D. Here, the resisting force from the workpiece—for example, the material being ground if the working member is a rotary grindstone—acts on locking nut 3 via working member D, but this resisting force points in the screwing direction of locking nut 3. Accordingly, as the work progresses, locking nut 3 is forced to turn further in the screwing direction by this resisting force, and its locked state becomes stronger. That is, it performs self-locking during the work.

When strong self-locking occurs in this way, it becomes very hard to relax it using a special tool. For example, in the case of rotary lawnmowers used by ordinary consumers, the relaxation operation becomes impossible as a result of this self-locking, and they have to be returned to the manufacturer for servicing.

Also, in the case of a conventional locking mechanism as mentioned above, it is assumed that a special tool will be used for locking/relaxation, and it is thus necessary to provide such a tool. If the tool is inadvertently lost, the lawnmower will again have to be returned to the manufacturer for servicing. In particular, incomplete care and loss of special tools is commonplace in the case of ordinary consumers and the necessity of a special tool is thus highly inconvenient.

Furthermore, even if this sort of special tool is used, repeated locking and relaxation under advanced self-locking conditions can often wear down the tool and make it unable to perform the desired function. For example, the pin or the like which temporarily locks the drive shaft during relaxation can often wear down relatively early.

In the light of such circumstances of the prior art, the present invention aims to maintain a securely locked state during working when the working member is locked to the rotary drive shaft in the locking mechanism of a rotary working member, and to perform relaxation easily by simple manual operation without a special tool during removal and replacement.

SUMMARY OF THE INVENTION

The essence of this invention is that the operating ring is externally fitted, with the ability to rotate, to the main body of the locking nut in between the locking flange and the flange of the locking nut; a ball bearing is inserted between the operating ring and the locking flange; three or more arc-shaped grooves are formed—facing toward each other and extending in concentric shapes in the circumferential direction—in the mating surfaces of the flange of the locking nut and the operating ring; locking balls are accommodated inside the arc-shaped grooves of the flange of the locking nut and the operating ring which face toward each other; the total dimension—in the axial direction of the rotary drive shaft—of each pair of arc-shaped grooves which accommodate the locking balls is set smaller than the diameter of a locking ball; and a localized indentation is formed at the bottom surfaces on at least one side of the said pairs of arc-shaped grooves.

When the locking nut is screwed to the small-diameter threaded part of the rotary drive shaft during locking, the working member is pressed against the end surface of the large-diameter part of the rotary drive shaft via the locking balls, and adopts a locked state. When the operating ring is manually turned during relaxation, the locking balls fall into the indentations of the arc-shaped grooves and the locking nut escapes from its state of being pressed against the operating ring. Accordingly, the locking nut turns easily in the unscrewing direction.

In essence, this invention involves changing from the conventional locking system based on a sliding pressure contact mode to a locking system based on a rolling pressure contact mode. As a result, the frictional coefficient ($\mu$) in the pressure contact locking mode decreases to about 0.01 from about 0.3 in the conventional case. A result of reducing the frictional coefficient in this way is that it can easily be made to escape from the pressure contact locking mode with a far smaller force.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
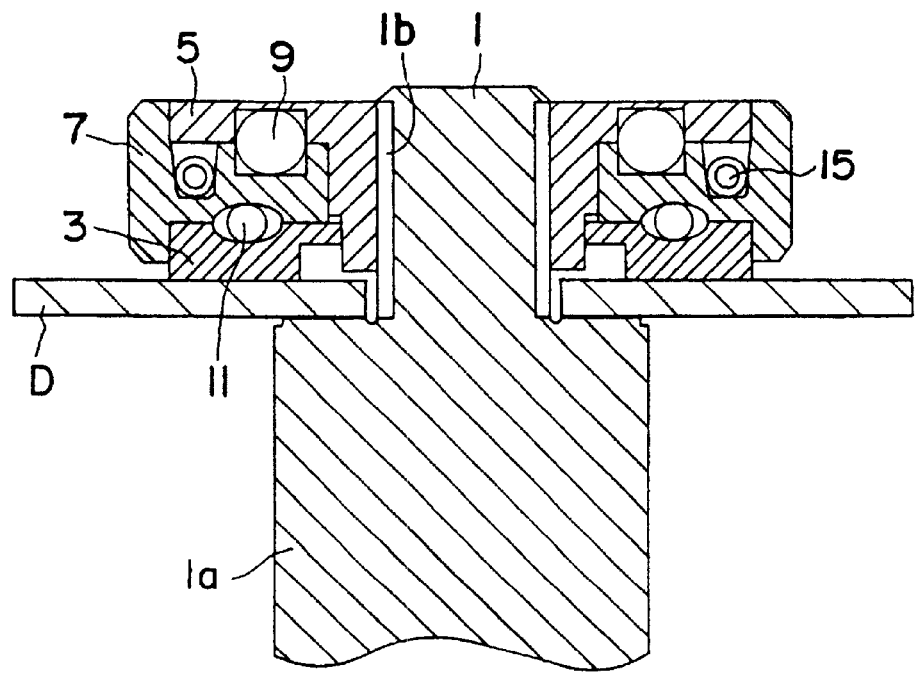
FIG. 1 is a partial cross section showing the assembled state of the overall configuration of one embodiment of this invention.

Repeat use of reference characters in the present specification and drawings is intended to represent same or analogous features or elements of the invention.

DETAILED DESCRIPTION OF THE PREFERRED EMBODIMENT

It is to be understood by one of ordinary skill in the art that the present discussion is a description of exemplary embodiments only, and is not intended as limiting the broader aspects of the present invention, which broader aspects are embodied in the exemplary construction.

Figure 2:
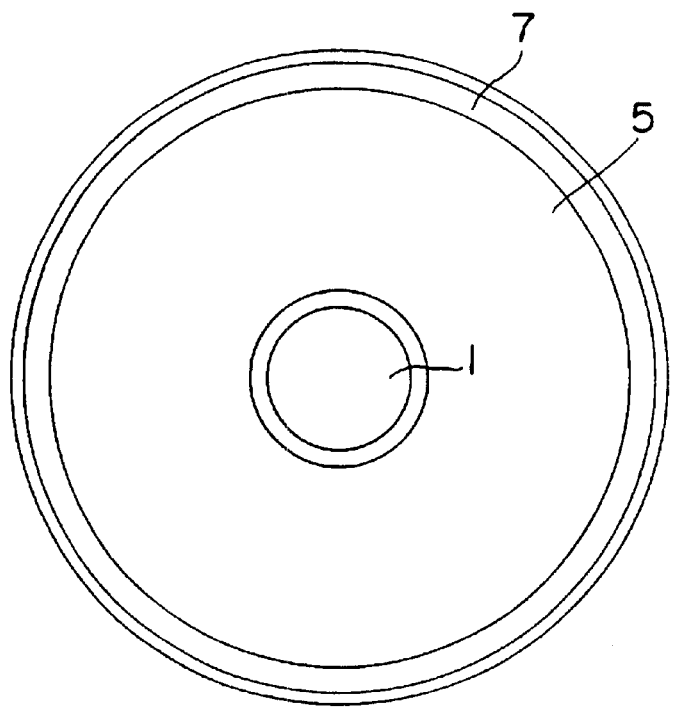
FIG. 2 is an end-on view of same.
Figure 3:
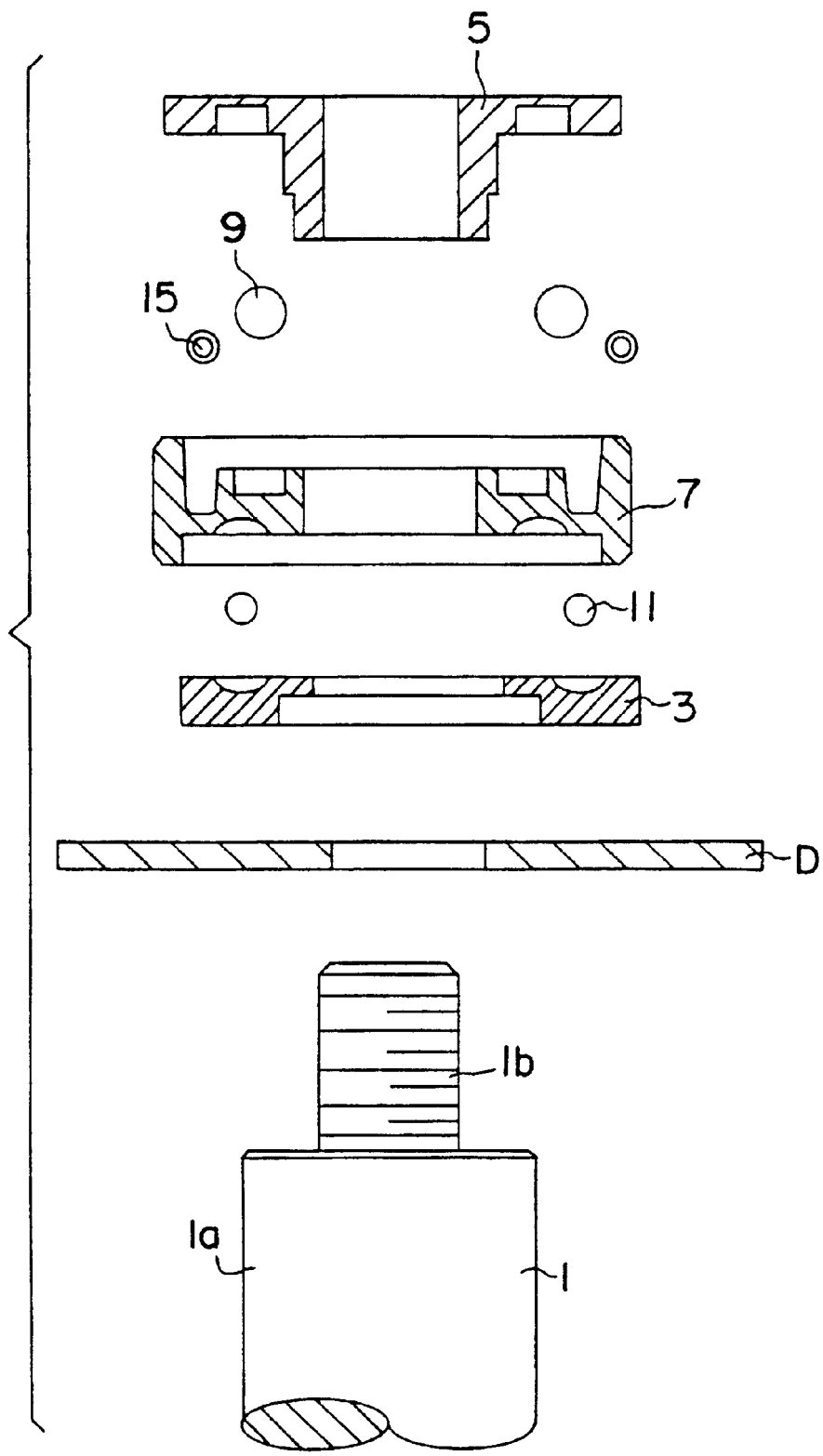
FIG. 3 is a partial cross-sectional side view showing the overall structure of same.

FIGS. 1 through 3 show an embodiment of a locking mechanism according to this invention, where the principal constituent elements are locking nut 5, operating ring 7 and locking flange 3, which is incorporated with rotary drive shaft 1; working member D is gripped between rotary drive shaft 1 and locking flange 3, a plurality of bearing balls 11 are inserted between locking flange 3 and operating ring 7, three or more locking balls 9 are inserted between operating ring 7 and locking nut 5, and a compression spring 15 for pressing the operating ring is provided inside operating ring 7. Details of how these constituent elements are assembled are described below.

Figure 4:
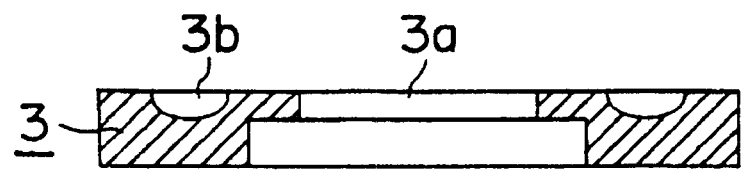
FIG. 4 is a cross-sectional side view showing the structure of the locking flange used in this locking mechanism.
Figure 5:
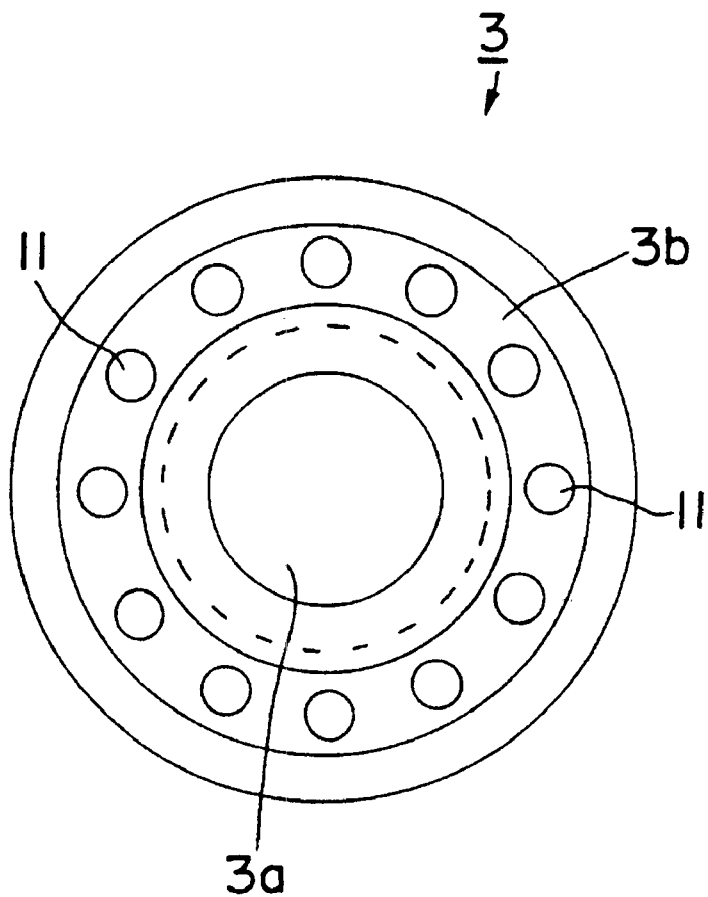
FIG. 5 is an end-on view of same.

FIGS. 4 and 5 show an example of locking flange 3. This locking flange 3 has a shaft hole 3a passing through its center part, whose diameter is set large enough to allow it to be loosely fitted to the main body of locking nut 5. As would be apparent to one skilled in this art, locking flange 3 is configured to be rotationally fixed but axially movable with respect to locking nuts. Also, a circumferential groove 3b for accommodating bearing balls 11 is formed by gouging in a concentric shape around shaft hole 3a.

Figure 6:
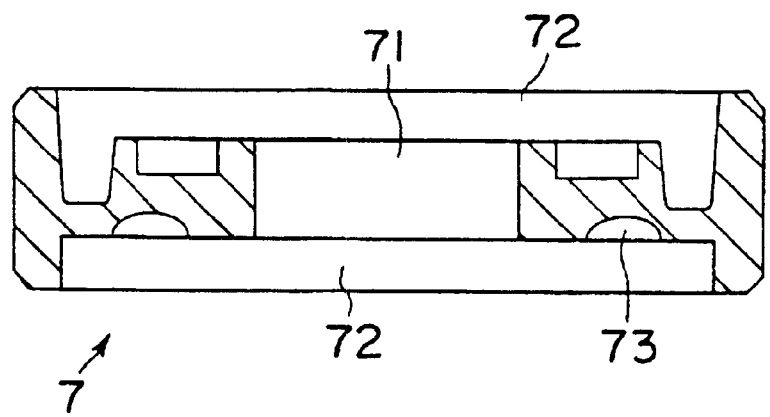
FIG. 6 is a cross-sectional side view showing the structure of the operating ring used in this locking mechanism.
Figure 7:
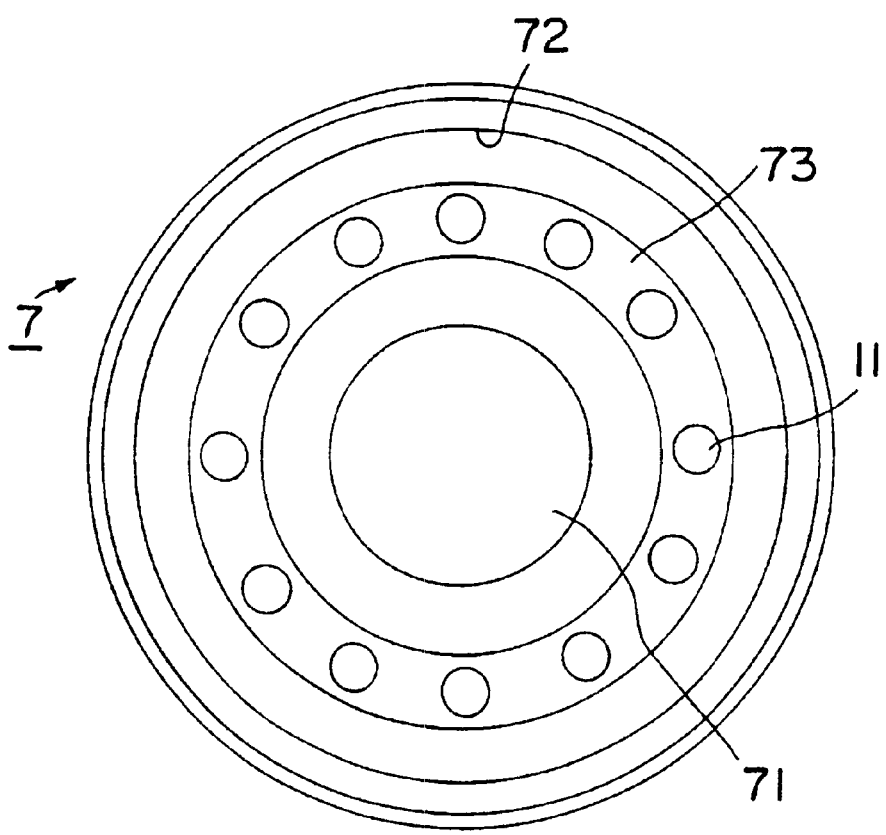
FIG. 7 is an end-on view of same.
Figure 8:
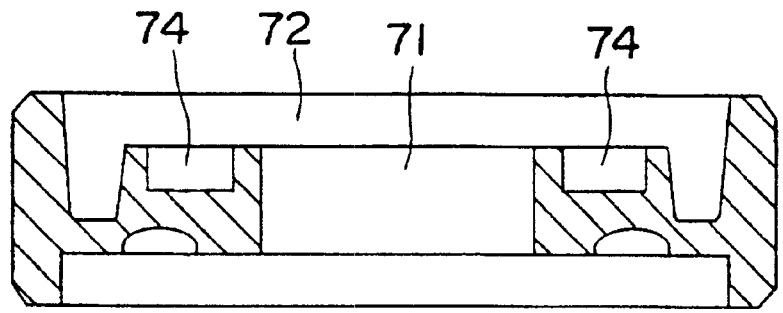
FIG. 8 is a cross-sectional side view showing the structure of the operating ring used in this locking mechanism in the same state as in FIG. 6.
Figure 9:
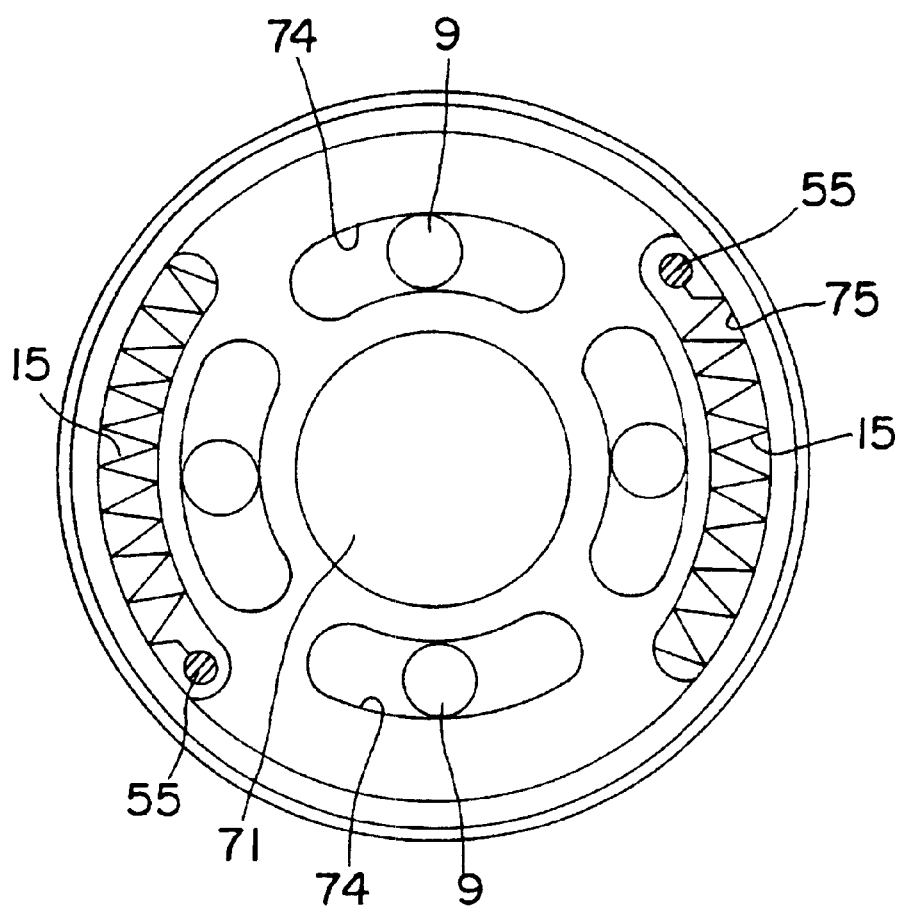
FIG. 9 is another end-on view of same.

FIGS. 6 and 7 show an example of operating ring 7. This operating ring 7 has a small-diameter shaft hole 71 passing through its center part, and large diameter holes 72 on both sides that interconnect with it. The diameter of small-diameter shaft hole 71 is set large enough to allow it to be loosely fitted to the main body of locking nut 5, and the two large-diameter shaft holes 72 are set large enough to allow them to be externally fitted to locking flange 3 and the flange of locking nut 5, respectively. Also, at the end surface that faces onto locking flange 3 in the incorporated state, a circumferential groove 73 for accommodating bearing balls 11 is formed by gouging in a concentric shape around the small-diameter shaft hole 71. Furthermore, in FIGS. 8 and 9, arc-shaped grooves 74 for accommodating locking balls 9 are concentrically formed by gouging around small-diameter shaft hole 71 in the end surface that faces onto locking nut 5 in the incorporated state. These arc-shaped grooves 74 are preferably arranged at equal angles in the circumferential direction; four arc-shaped grooves 74 are formed in the illustrated example, but this number is set to a suitable value of three or more according to the conditions of use. From the viewpoint of structural balance, it is preferable to form an even number of four or more arc-shaped grooves 74 in pairs.

Also, at least one arc-shaped groove 75 for accommodating a pushing compression spring 15 is formed by gouging on the outside of these arc-shaped grooves 74. A securing pin 55, which projects out from locking nut 5, intrudes into the vicinity of one of the end parts inside this arc-shaped groove 75; one end of compression spring 15 is fixed to this securing pin 55, and the other end makes contact with the end of the arc-shaped groove 75 at the opposite side to that of securing pin 55. Accordingly, this compression spring 15 presses on operating ring 7 in a clockwise direction in the figure. This pressing direction is set so as to secure the locking balls 9 in the locked state as described below.

Figure 10:
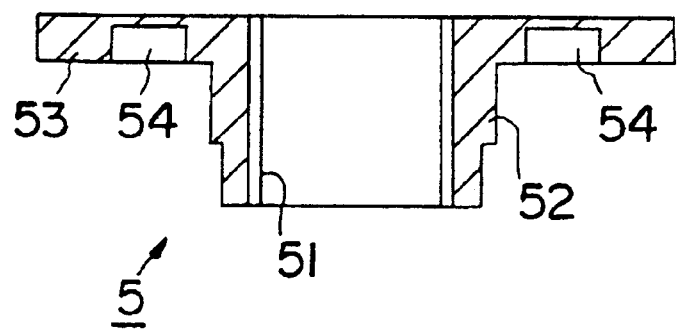
FIG. 10 is a cross-sectional side view showing the structure of the locking nut used-in this locking mechanism.
Figure 11:
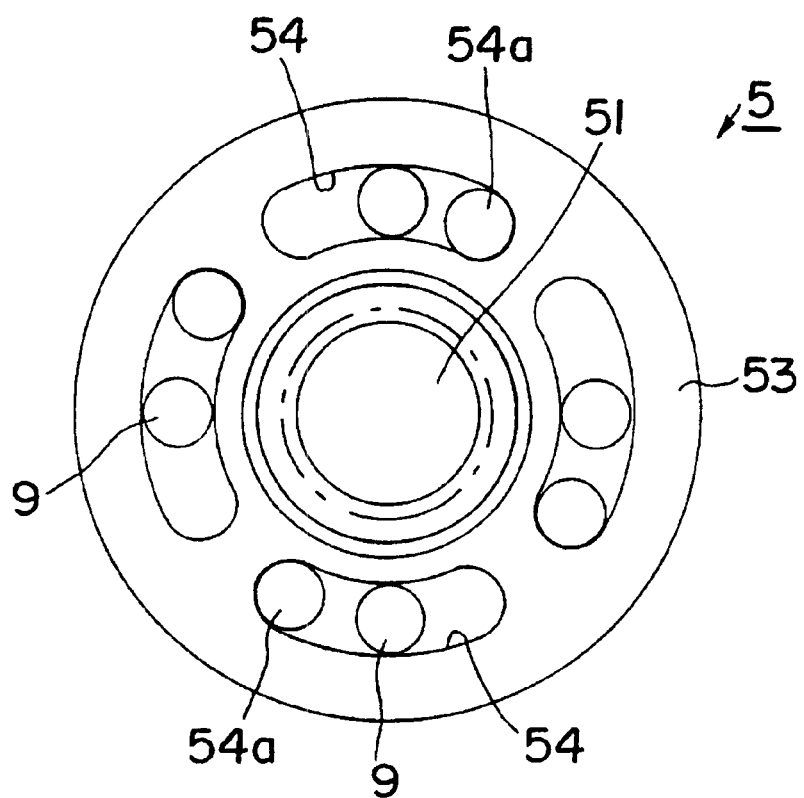
FIG. 11 is an end-on view of same.

FIGS. 10 and 11 show an example of locking nut 5. This locking nut 5 has a main body 52, a flange 53, and a threaded shaft hole 51 passing through the center parts thereof. The thread of this shaft hole 51 is set so that it can be screwed onto the small-diameter threaded part 1b of rotary drive shaft 1. Arc-shaped grooves 54 for accommodating locking balls 9 around shaft hole 51 are concentrically formed by gouging in the end surface facing onto operating ring 7 in equal numbers and at corresponding positions to the locking ball arc-shaped grooves 74 of operating ring 7 in the assembled state. Localized indentations 54a, into which the locking balls 9 escape during relaxation as described below, are formed in the bottom surface at one end of each arc-shaped groove 54.

Figure 13:
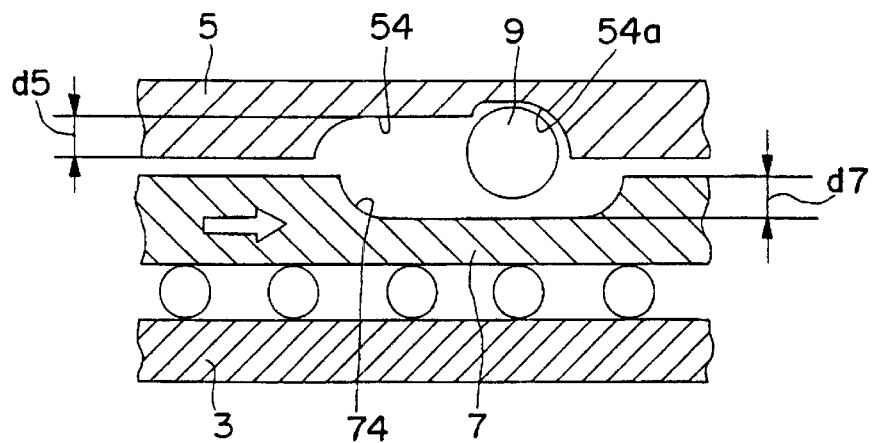
FIG. 13 is a cross-sectional side view showing the relationship between the arc-shaped grooves and the locking balls in the relaxed state.
Figure 14:
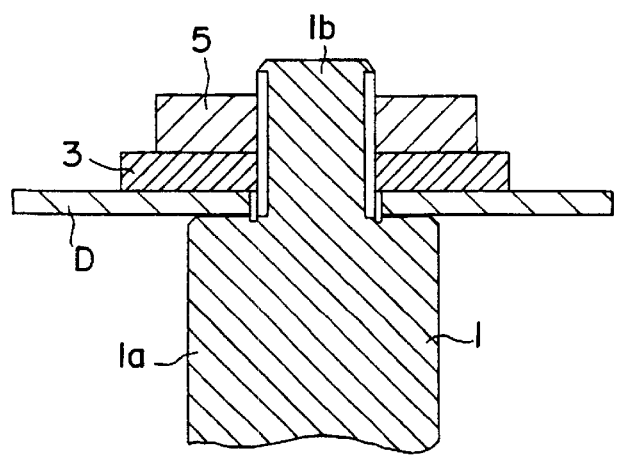
FIG. 14 is a partial cross-sectional side view showing the configuration of a conventional locking mechanism.

In the above configuration, the dimensions of the arc-shaped grooves 74 on operating ring 7 and of arc-shaped grooves 54 on locking nut 5 are set as follows: as shown in FIG. 13, the dimensions of the arc-shaped grooves are respectively set so that the sum (d5+d7) of the depths (the dimension in the axial direction of the rotary drive shaft) d7 of arc-shaped grooves 74 and the depths (the dimension in the axial direction of the rotary drive shaft) d5 of arc-shaped grooves 54 are smaller then the diameter of the locking balls 9.

Figure 12:
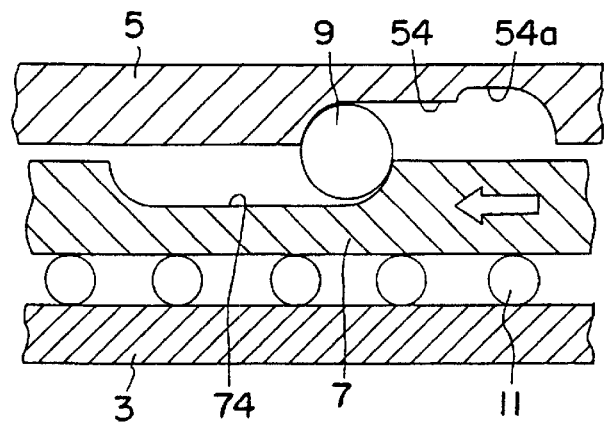
FIG. 12 is a cross-sectional side view showing the relationship between the arc-shaped grooves and the locking balls in the locked state.

Next, the action is described according to FIGS. 12 and 13. During locking, the locking ring is first turned manually in the locking direction as shown by the arrow in FIG. 12, whereupon the locking balls 9 are wedged between the ends of arc-shaped grooves 74 in operating ring 7 and the ends of arc-shaped grooves 54 in locking nut 5. In this state, due to the aforementioned relationship between the depth of arc-shaped grooves 74 and 54 and the diameter of locking balls 9, a slight gap is left between the mating surfaces of operating ring 7 and locking nut 5. As operating ring 7 is turned further still, locking nut 5 is turned via locking balls 9 which are in a wedged state, and since it is screwed to the small-diameter threaded part 1b of rotary drive shaft 1, working member D is locked by pressing against the end surface of large-diameter part 1a of rotary drive shaft 1 via operating ring 7 and locking flange 3. Thus, as shown in FIG. 1, axial force is transferred from working member D to locking nut 5 through locking flange 3, bearing balls 11, operating ring 7 and locking balls 9. Meanwhile, compression spring 15 acts so as to maintain the wedged state of locking balls 9.

Since the resisting forces acting on working member D during operating point in the same direction, this locked state is further intensified.

When relaxation is performed in order to replace or remove working member D, a suitable jig is used to lock rotary drive shaft 1, and operating ring 7 is then turned manually in the relaxation direction (which is the opposite of the locking direction) as shown by the arrow in FIG. 13. As indicated in FIGS. 12 and 13, the operating ring rotates between balls 9 and 11, which act as bearings rolling in grooves 74 and 73, respectively, at half the speed of operating ring 7 locking ball 9 this and fall into the localized indentations 54a of arc-shaped grooves 54 in locking nut 5 as shown in FIG. 13, thereby escaping from the wedged state. As a result, locking nut 5 enters a state in which it is released from the influence of the resisting force that was acting on it via working member D, and thus the relaxation is completed by simply turning it by hand in the relaxation direction.

Note that in the above-mentioned embodiment, compression springs 15 are accommodated inside arc-shaped grooves 75 of operating ring 7, and the securing pins 55 which project from locking nut 5 are made to engage with these compression springs 15 by projecting into the arc-shaped grooves 75 of operating ring 7; however, the opposite configuration is also possible. That is, the compression springs 15 can be accommodated inside arc-shaped grooves formed by gouging in locking nut 5, and securing pins projecting from operating ring 7 can be made to project into the arc-shaped grooves of the locking nut to engage with the compression springs 15.

Also, in the above-mentioned embodiment, a localized indentation is formed in the side of arc-shaped groove 54 of locking nut 5, but alternatively a localized indentation can be formed in the side of arc-shaped groove 74 of operating ring 7, or corresponding localized indentations can be formed in both arc-shaped grooves 54 and 74.

Working members that can be locked using the locking mechanism of this invention include the rotary grindstones of grinders, the rotary blades of cutters and the wire cutters of lawnmowers, and any members that are expected to work by rotating.

The locking mechanism of this invention, which is based on a rolling pressure contact mode, reduces the frictional coefficient ($\mu$) in the pressure contact locked state to 1/10 or less that of conventional mechanisms, and as a result the force needed to escape from the pressure contact locked state is about 1/30 to 1/50 that of conventional mechanisms. Consequently, it becomes very easy to replace and remove the working member. Also, since the operating ring needs only be turned by hand to achieve relaxation, a special tool is unnecessary. Consequently, it is very easy to replace and remove the working member. Problems such as tool wear are also eliminated.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

LIST OF REFERENCE NUMERALS

1: rotary drive shaft
1a: large-diameter part
1b: small-diameter threaded part
3: locking flange
3d: arc-shaped grooves for bearings
5: locking nut
54: arc-shaped grooves for locking balls
54a: localized indentation
55: securing pin for pressing compression spring
7: operating ring
73: circumferential groove for bearings
74: arc-shaped groove for locking balls
75: arc-shaped groove for pressing compression spring
9: locking ball
11: bearing ball
15: compression spring for pressing
D: working member

What is claimed is:

1. Locking mechanism for a rotary working member wherein a working member (D) and a locking flange (3) are loosely fitted to the small-diameter threaded part of a rotary drive shaft (1) equipped with a large-diameter part and a small-diameter threaded part, which mechanism is of a type wherein a locking nut (5)—which comprises a main unit and a flange and is screwed to the small-diameter threaded part presses the working member against the end surface of the large-diameter part of the rotary drive shaft via the locking flange, thereby locking the working member to the rotary drive shaft, characterized in that: an operating ring (7) is externally fitted, with the ability to rotate, to the main body of the locking nut in between the locking flange and the flange of the locking nut; a ball bearing is inserted between the operating ring and the locking flange; three or more arc-shaped grooves are formed—facing toward each other and extending in concentric shapes in the circumferential direction—in the mating surfaces of the flange of the locking nut and the operating ring; locking balls (9) are accommodated inside the arc-shaped grooves of the flange of the locking nut and the operating ring which face toward each other; each pair of arc-shaped grooves which accommodate the locking balls has a total dimension—in the axial direction of the rotary drive shaft—which is less than the diameter of a locking ball; and a localized indentation is formed at the bottom surfaces on at least one side of the said pairs of arc-shaped grooves.

2. Locking mechanism as claimed in claim 1, characterized in that the said locking nut and operating ring are elastically forced together so as to wedge the locking balls between the ends of each pair of arc-shaped grooves.

3. Locking mechanism as claimed in claim 2, characterized in that the forcing means that performs the said elastic forcing together is configured from: an arc-shaped groove formed by gouging the locking nut or the operating flange at the mating surface of these members, a securing pin that projects from the other member into this arc-shaped groove, and a compression spring that is accommodated inside the said arc-shaped groove with one end engaging with the securing pin and the other end in contact with the end of the arc-shaped groove.

4. Locking mechanism as claimed in claim 1, characterized in that the said working member is disk-shaped.

* * * * *

UNITED STATES PATENT AND TRADEMARK OFFICE
CERTIFICATE OF CORRECTION

PATENT NO. : 6,273,659 B1
DATED : August 14, 2001
INVENTOR(S) : Yoshiaki Goto

It is certified that error appears in the above-identified patent and that said Letters Patent is hereby corrected as shown below:

<u>Column 4,</u>
Line 65, please add a -- . -- after the number "7".
Line 65, please delete the phrase "locking ball 9 this and" and replace with -- Locking balls 9 then --.

Signed and Sealed this

Third Day of May, 2005

JON W. DUDAS
*Director of the United States Patent and Trademark Office*